United States Patent [19]

Ivanov et al.

[11] Patent Number: 5,542,111
[45] Date of Patent: Jul. 30, 1996

[54] METHOD FOR TRANSMISSION POWER CONTROL OF A MOBILE STATION

[75] Inventors: Kolio Ivanov, Munich; Norbert Metzner, Treuchtlingen, both of Germany

[73] Assignee: Siemens Aktiengesellschaft, Munich, Germany

[21] Appl. No.: 210,616

[22] Filed: Mar. 18, 1994

[30] Foreign Application Priority Data

Mar. 19, 1993 [DE] Germany .......................... 43 08 904.6

[51] Int. Cl.$^6$ .................................................. H01Q 11/12
[52] U.S. Cl. .......................... 455/126; 455/33.1; 455/54.1; 455/69; 455/70
[58] Field of Search .............................. 455/60, 70, 54.1, 455/56.1, 38.3, 226.1, 126, 67.1, 67.3, 33.1; 379/59, 60

[56] References Cited

U.S. PATENT DOCUMENTS

| | | | |
|---|---|---|---|
| 4,556,760 | 12/1985 | Goldman .............................. | 179/2 EB |
| 4,752,967 | 6/1988 | Bustamante et al. ...................... | 455/12 |
| 4,811,421 | 3/1989 | Havel et al. ............................... | 455/69 |
| 5,241,690 | 8/1993 | Larsson et al. ......................... | 455/54.1 |
| 5,267,262 | 11/1993 | Wheatley III ............................... | 375/1 |
| 5,305,468 | 4/1994 | Poruckert et al. ......................... | 455/69 |
| 5,333,175 | 7/1994 | Ariyavisitakul et al. .................. | 379/58 |

*Primary Examiner*—Reinhard J. Eisenzopf
*Assistant Examiner*—Lee Nguyen
*Attorney, Agent, or Firm*—Hill, Steadman & Simpson

[57] ABSTRACT

In a method for regulating transmission power control of a mobile station, transmission power control occurs based on a hierarchical control system composed of two levels. Long-term transmission power control of the mobile station occurs in the base station on the upper level, which forms a closed control loop comprising a base station and a mobile station. In addition, a statement about decision authority of the lower level is made in the base station and is communicated to the mobile station. Taking the long-term transmission power identified by the base station and taking the statement about the decision authority of the lower level into consideration, the short-term transmission power of the mobile station is calculated on the lower level, which represents a local control loop implemented in the mobile station.

5 Claims, 2 Drawing Sheets

METHOD FOR TRANSMISSION POWER CONTROL OF A MOBILE STATION

BACKGROUND OF THE INVENTION

The invention is directed to a method for controlling the transmission power of a mobile station in a mobile cellular radio network having base stations in a mutual spatial arrangement.

Co-channel interference and adjacent channel interference have a primary influence on the reception quality of the useful signal in cellular mobile radio networks. In order to keep these co-channel and adjacent channel disturbances to an optimally low level, the transmission power of the mobile station and/or of the base station can be controlled, taking the channel quality into consideration. A reduction of the transmission power of radio links with high channel quality to a level at which an adequate reception quality is still assured leads to a reduction of the co-channel and adjacent channel interference on other radio links, and thus leads to an improvement of the reception quality of these radio links. By improving the interference situation in cellular mobile radio networks, the frequency reuse distance can be reduced, and thus the capacity of the network can be enhanced.

It is also important for the mobile station to reduce the transmission power to a minimally required level in order to efficiently manage the existing energy. This enables a longer operating duration or smaller, lighter mobile device as well.

The control of the transmission power of the mobile station should occur as currently and as exactly as possible in order to keep the reception quality of the data at a defined level. The co-channel and adjacent channel interference can thereby be efficiently reduced and the energy of the mobile station can be economically utilized.

The considerable time-lag between measurement acquisition and adaptation of the transmission power has proven problematical in previous methods. In, for example, GSM, approximately two seconds elapse from the acquisition of the first measured value in the base station up to the adaptation of the transmission power of the mobile station, and even up to three seconds under certain circumstances. When, for example, the mobile station is moving at a speed of 30 km/h, then it covers 8.4 m in one second; i.e., given wavelengths of a few centimeters (GSM:f=900 MHz←→ λ=33 cm, UMTS:f=2000 MHz←→λ=15 cm), the propagation conditions, and thus the channel quality, have meanwhile changed significantly. Consequently, an adaptation of the transmission power occurs to propagation conditions that are not any longer relevant. An almost delay-free control of the transmission power of the mobile station is therefore desirable.

On the other hand, the repetition period of the adaptation may not be reduced arbitrarily because of a necessary minimum measuring period in order to not destabilize the system due to fast and local variations of the propagation conditions. A tracking of the fast fading (Rayleigh, Rice) would lead to instability of the system. The effects of the fast fading are therefore to be filtered out (for example, on the basis of a suitable averaging) so that the control algorithm is effective for path loss and slow fading that mainly arises due to shadowing and reflections.

SUMMARY OF THE INVENTION

The objective of the invention is to specify a method by means of which the transmission power of a mobile station can be controlled as delay-free, as exactly and as stably as possible.

In accordance with the invention, a method is provided for the transmission power control of a mobile station in a mobile cellular radio network having base stations in a mutual spatial arrangement. A hierarchical system consisting of two levels is proposed such that on the upper level a long-term transmission power control of the mobile station is performed in a base station (long-term control) based on a closed mobile station is performed in a base station (long-term control) based on a closed control loop comprising the base station and a mobile station. Additionally, on the upper level a statement about the decision authority of the lower level is made in the base station and is communicated to the mobile station. Short-term transmission power control (short-term control) of the mobile station is identified on the lower level, which represents a local control loop implemented in the mobile station, taking the long-term transmission power calculated by the base station and the statement about the decision authority of the lower level into consideration.

The method in accordance with the invention is thereby based on a hierarchical system having two levels of control functions. A long-term control decision (repetition time T1) is thereby made on the upper level, and in addition the parameters for the direct, short-term control with a repetition time of T2<T1 implemented on the lower level are also calculated. The upper level comprises a base station and a mobile station and represents a closed control loop with significant delay times, whereas the lower level is situated exclusively in the mobile station and represents a local control function. Based on measurements of the uplink and on prescribed thresholds of the operation and maintenance control (O & M parameters) in the base station, the upper level controls the long-term transmission power $\bar{P}_{t,\,ul}$ of the mobile station and, in addition, defines the parameters of the local control function of the mobile station. Based on measurements of the downlink, this control function is thus enabled to undertake faster changes of the uplink transmission power than the slow control loop allows. Since inference of downlink properties from those of the uplink is permissible only to a limited degree in a frequency duplex system, the afore-mentioned parameters essentially represent a statement about the admissibility of the reciprocity assumption.

As a result of the techniques of the invention, a relatively fast reaction of the critical mobile station transmission power to changing propagation conditions is achieved by displacing limited decision authority from the network into the mobile station. Moreover, unstable system conditions are prevented by applying a restricted and well defined control range. Furthermore, the network benefits substantially from the reduced signalling lead on the air interface by applying a reciprocity criterion.

It is possible to adapt the method to various cell sizes and data rates on the basis of variable filter parameters. The method is also applicable in case of multiple slots being allocated to a specific link.

The transmission power $P_{t,\,ul}$ of the mobile station is thereby controlled according to the following data: by the long-term transmission power $\bar{P}_{t,\,ul}$ prescribed by the base station, a parameter calculated by the base station for the short-term control upon utilization of an identifier for the reciprocity of the radio channel as well as a filtered level and quality of the reception signal (downlink).

The invention is explained in greater detail below with reference to an exemplary embodiment shown in the drawings.

DESCRIPTION OF THE PREFERRED EMBODIMENTS

Figure 1:
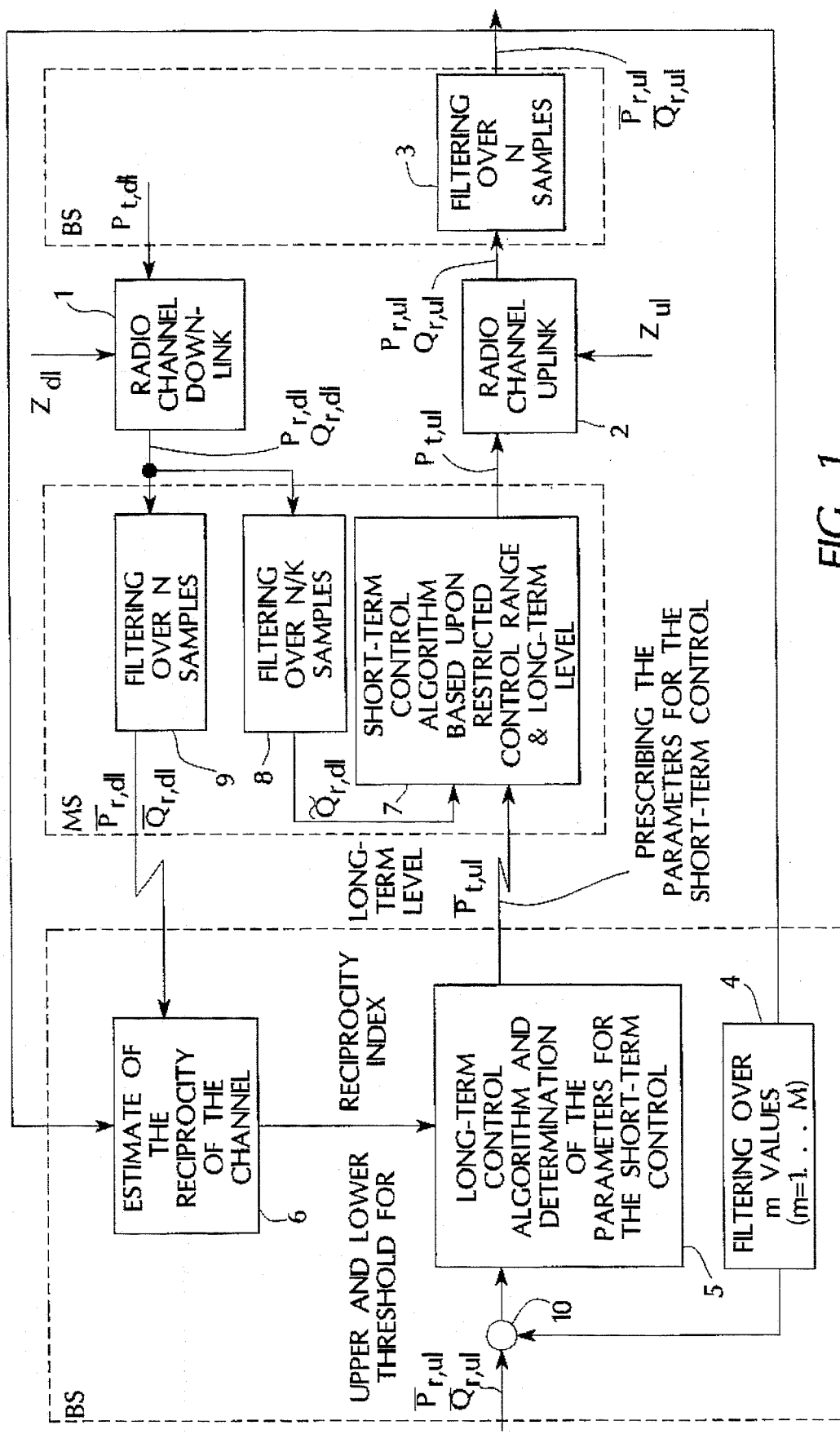
FIG. 1 represents a block diagram of modules for implementing the method for controlling the transmission power of a mobile station.

In FIG. 1, the mobile station MS and the base station BS are each respectively shown by a box with broken lines, whereby the base station BS is shown at both sides of the mobile station MS for a clearer illustration of the control loops. The radio channel 1 (downlink) lies between base station and mobile station, and the radio channel 2 (uplink) lies in the opposite transmission direction from the mobile station MS to the base station BS. The disturbances appearing on the radio channel are referenced $Z_{d1}$ or $Z_{ul}$ and are marked by an arrow directed onto the respective boxes 1 and 2.

The control of the long-term transmission power $\overline{P}_{t,\,ul}$ of the mobile station MS occurs in the base station on the basis of the following quantities: received power $P_{r,\,ul}$ filtered over N samples (=T1) and received signal quality $Q_{r,\,ul}$ of the uplink filtered over N samples (=T1), whereby the filtering (for example, averaging) occurs in filter 3 of the base station BS, as well as via the thresholds for these two quantities defined as O & M parameters. The upper and lower thresholds for the filtered received power $\overline{P}_{t,\,ul}$ and the filtered received quality $\overline{Q}_{r,\,ul}$, are forwarded to a second input of a subtraction element 10 whose output side is connected to a box 5 containing the long-term control algorithm and determination of the parameters for the short-term control. The calculated values of the received power and received quality at the output of the filter 3 can be submitted to another filtering, for example a moving average, over m values. This occurs in the filter 4 arranged in the connecting path between filter output 3 and subtraction element 10 of the base station. The O & M parameter m is dependent, among other things, on cell type and on cell size.

In the method in accordance with the invention, a statement about the reciprocity of the radio channel is additionally made in the base station from the filtered measurement results $\overline{P}_{r,\,ul}$ and $\overline{Q}_{r,\,ul}$ of the uplink as well as from the data of the filtered received values $\overline{P}_{r,\,d1}$ and $\overline{Q}_{r,\,d1}$ of the downlink communicated from the mobile station to the base station. This estimate of the reciprocity of the channel (identification) is made in module 6 arranged in the connecting path between filter 3 and module 5. The result of the estimate is supplied to module 5 as a reciprocity index, and is communicated to the mobile station MS unmodified along with the long-term level $\overline{P}_{t,\,ul}$ as an input information for the short-term control decision. The mobile station MS contains a module 7 for the short-term control algorithm based upon restricted control range and long-term level.

In order to be able to control the transmission power $P_{t,\,ul}$ of the mobile station MS as close to reality as possible, restricted decision authority is transferred to the mobile station MS. For limitation of the signalling effort connected therewith, the control function on the lower level implemented in the mobile station is based on measurements of the downlink. For this purpose, the received quality $Q_{r,\,d1}$ in the mobile station MS is filtered over N/K samples (=T2). K is an O & M parameter the maximum value of which is limited by a requirement for suitable filtering, i.e. a minimum number of samples is required in order to filter the fast fading out and to reliably identify the slow fading. At the same time, K is a measure for the currentness of the control, i.e. the control for K=1 occurs only according to the long-term value $\overline{P}_{t,\,ul}$ with the aforementioned disadvantages. The filtered output signal $\tilde{Q}_{r,\,d1}$ of filter 8 is fed to the input of module 7.

Since the mobile station is not aware of the global propagation situation, the identifier already handled is given priority over the short-term control algorithm. This identifier is used to determine the admissible direction and the maximum amount of change of the short-term transmission power $P_{t,\,ul}$. An additional stabilizing effect can be achieved by relating the admissible direction and the maximum amount of change to the type and amount of the last change of the long-term transmission power $\overline{P}_{t,\,ul}$.

Figure 2:
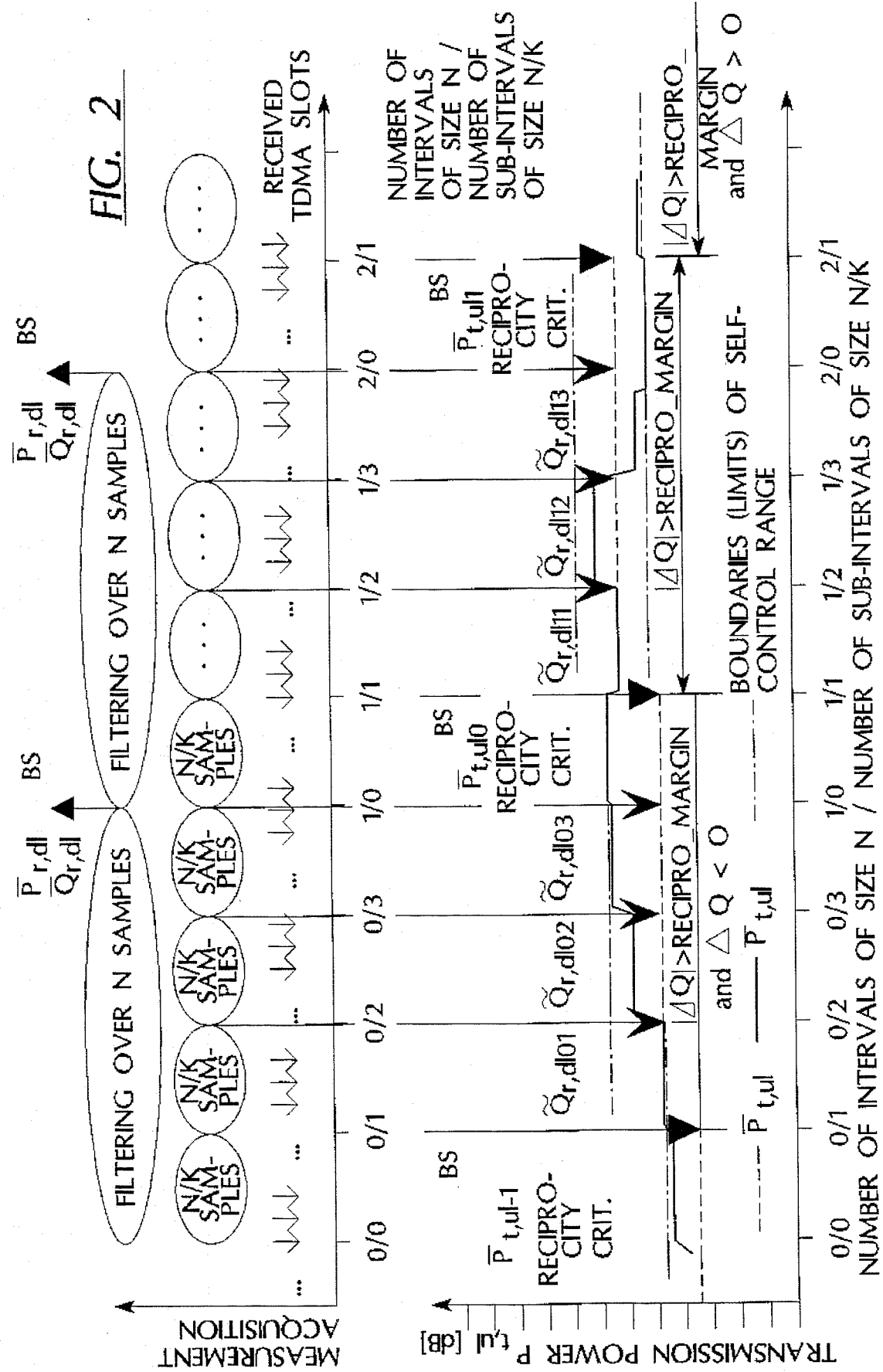
FIG. 2 illustrates the variations over time of the mobile station transmission power as well as of the relationship between measurement acquisition and transmission power control (K=4, as an example).

If the transmission power control of the base station takes place immediately after receiving and processing the values of received power $P_{r,\,d1}$ and received quality $\overline{Q}_{r,\,d1}$ communicated from the mobile station, then the power control algorithm to be implemented in the mobile station shall take the changing base station transmission power into consideration. A simple example is the possibility for suppressing the first N/K interval of an N interval as indicated for K=4 in FIG. 2 illustrating the time variation of the mobile station transmission power $P_{t,\,ul}$ as well as the relationship between measurement acquisition and transmission power control in the mobile station. In that way, an additional signalling effort can be saved.

In detail, the lower part of the illustration in FIG. 2 shows the transmission power $P_{t,\,ul}$ over the number of intervals of size N relative to the number of sub-intervals of size N/K. The measurement acquisition process is shown in the upper part of FIG. 2 in an appropriate functional dependency. The filtering over N samples is indicated on the top of the measurement acquisition process (see filter 9 in FIG. 1), and just below it the filtering over N/K samples (see filter 8 in FIG. 1). Corresponding to the factor 4 chosen for K, 4 N/K samples are located within the range for filtering over N samples. In each case, after N samples, the measured values of the filtered received power $\overline{P}_{r,\,d1}$ and received quality $\overline{Q}_{r,\,d1}$ are communicated to the base station.

As shown in the diagram for the transmission power after expiration of the first N/K interval, both the long-term power level $\overline{P}_{t,\,ul}$ and the reciprocity criterion are communicated from the base station to the mobile station as parameters for the short-term control. During the following 3 N/K intervals the transmission power control occurs in the mobile station itself based on the received quality $\tilde{Q}_{r,\,d1}$ as an output quantity of the filtering over N/K samples (see filter 8 in FIG. 1). After expiration of the first N/K interval in the second section of the filtering over N samples, the long-term power level along with the prescription of the parameters for the short-term control (reciprocity criterion) is again communicated from the base station to the mobile station. Again, during the next three N/K intervals, the short-term control occurs in the mobile station itself via the received quality $\tilde{Q}_{r,\,d1}$.

The following statements serve the purpose of calculating the reciprocity criterion. A conclusion about the reciprocity of the channel is to be drawn from the available information about uplink and downlink on the basis of a suitable algorithm. Moreover, prescriptions from a higher level authority can be incorporated as well, e.g. O & M parameters. A simple but efficient algorithm is set forth below as an example: the difference $\Delta Q$ is formed from the filtered quality values of the radio links BS→MS ($\overline{Q}_{r,\,dl}$) and MS→BS ($\overline{Q}_{r,\,ul}$): $\Delta Q = \overline{Q}_{r,\,ul} - \overline{Q}_{r,\,dl}$. If the absolute value of the difference is less than or equal to an O & M parameter (e.g. RECIPRO-MARGIN), then the mobile station is allowed to control its transmission power autonomously within prescribed limits. This tolerated bandwidth should be kept relatively narrow. When $\Delta Q$ is positive and greater than this O & M parameter (RECIPRO-MARGIN), i.e. the quality of the uplink is better than that of the downlink, then the mobile station is allowed to reduce its transmission power only to a prescribed lower limit. This limit can be greater than the afore-mentioned bandwidth. When $\Delta Q$ is negative and its absolute value is greater than the O & M parameter, i.e. the quality of the downlink is better than that of the uplink, then the mobile station can boost its transmission power only to a prescribed upper limit. This limit should be greater than in the preceding case (for this, see the plot of the transmission power $P_{t,\,ul}$ in the lower diagram of FIG. 2).

Although various minor changes and modifications might be proposed by those skilled in the art, it will be understood that we wish to include within the scope of the patent warranted hereon all such changes and modifications as reasonably come within our contribution to the art.

We claim as our invention:

1. A method for controlling transmission power of a mobile station in a mobile radio cellular network having a base station, comprising the steps of:

establishing a hierarchial control system composed of an upper and a lower level;

providing on the upper level a closed loop transmission power control of the mobile station, said closed control loop comprising the base station and the mobile station, and generating in the base station long-term power control commands at a low rate based on uplink measurements;

providing on the lower level an open loop transmission power control of the mobile station implemented in the mobile station, said open loop control generating short-term power control commands at a high rate based on downlink measurements and additionally taking into account a reciprocity criterion calculated at the base station and communicated to the mobile station along with the long-term power control commands as a reference transmit power level, said reciprocity criterion evaluating reciprocity of uplink and downlink channels based on said uplink and downlink measurements; and utilizing the reciprocity criterion to determine a permissible range of said short-term power control commands.

2. A method according to claim 1 wherein said closed loop transmission power control of the mobile station being based on a filtered over N samples of measurement values of received power and received quality of said uplink channel from the mobile station to the base station, and thresholds prescribed for said received power and said received quality as operation and maintenance parameters;

making an estimate about reciprocity of a transmission channel based on values of received power and received quality of said downlink channel from the base station to the mobile station which are known to the base station for controlling transmission power of the base station, said received power and said received quality of said downlink channel being filtered over N samples, and also basing said estimate about reciprocity based on said received power and said received quality of said uplink channel from the mobile station to the base station, said estimate about reciprocity being communicated to the mobile station; and processing said received quality of said downlink channel by filtering over N/K samples, where K is an operation and maintenance parameter.

3. A method according to claim 2 wherein K has an upper limit due to required averaging-out of fast fading.

4. A method according to claim 1 wherein both a permissible direction and a maximum permissible magnitude of change of the transmission power are made dependent on type and magnitude of a last change of long-term transmission power of the mobile station.

5. A method according to claim 1 wherein for calculating said reciprocity criterion, a difference is formed from average quality values of the uplink and downlink channels from the base station to the mobile station and from the mobile station to the base station where the mobile station can control its transmission power autonomously within a tolerated bandwidth as long as an absolute value of said difference is smaller than or equal to an operation and maintenance parameter for reciprocity-margin, the mobile station reducing its transmission power only to a prescribed limit when said difference is positive and greater than said operation and maintenance parameter reciprocity-margin, and wherein said mobile station can boost its transmission power only to a prescribed limit when said difference is negative and its absolute value is greater than said operation and maintenance parameter reciprocity-margin.

* * * * *